July 21, 1959 R. N. JOHNSON 2,895,207
APPARATUS FOR MOLDING BURIAL VAULT DOMES
Filed April 30, 1954 3 Sheets-Sheet 1
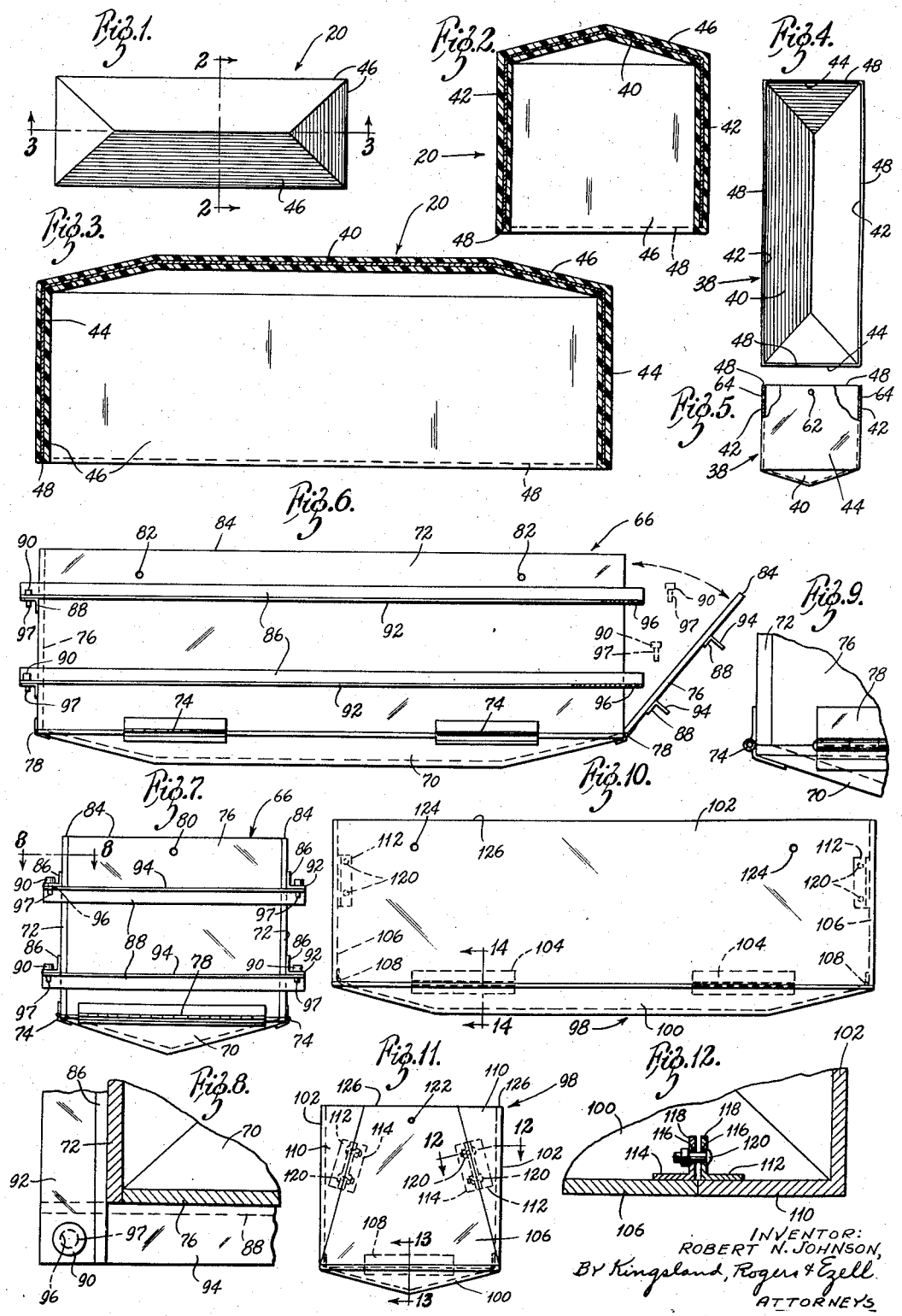
INVENTOR:
ROBERT N. JOHNSON,
By Kingsland, Rogers & Ezell
ATTORNEYS July 21, 1959 R. N. JOHNSON 2,895,207
APPARATUS FOR MOLDING BURIAL VAULT DOMES
Filed April 30, 1954 3 Sheets-Sheet 2
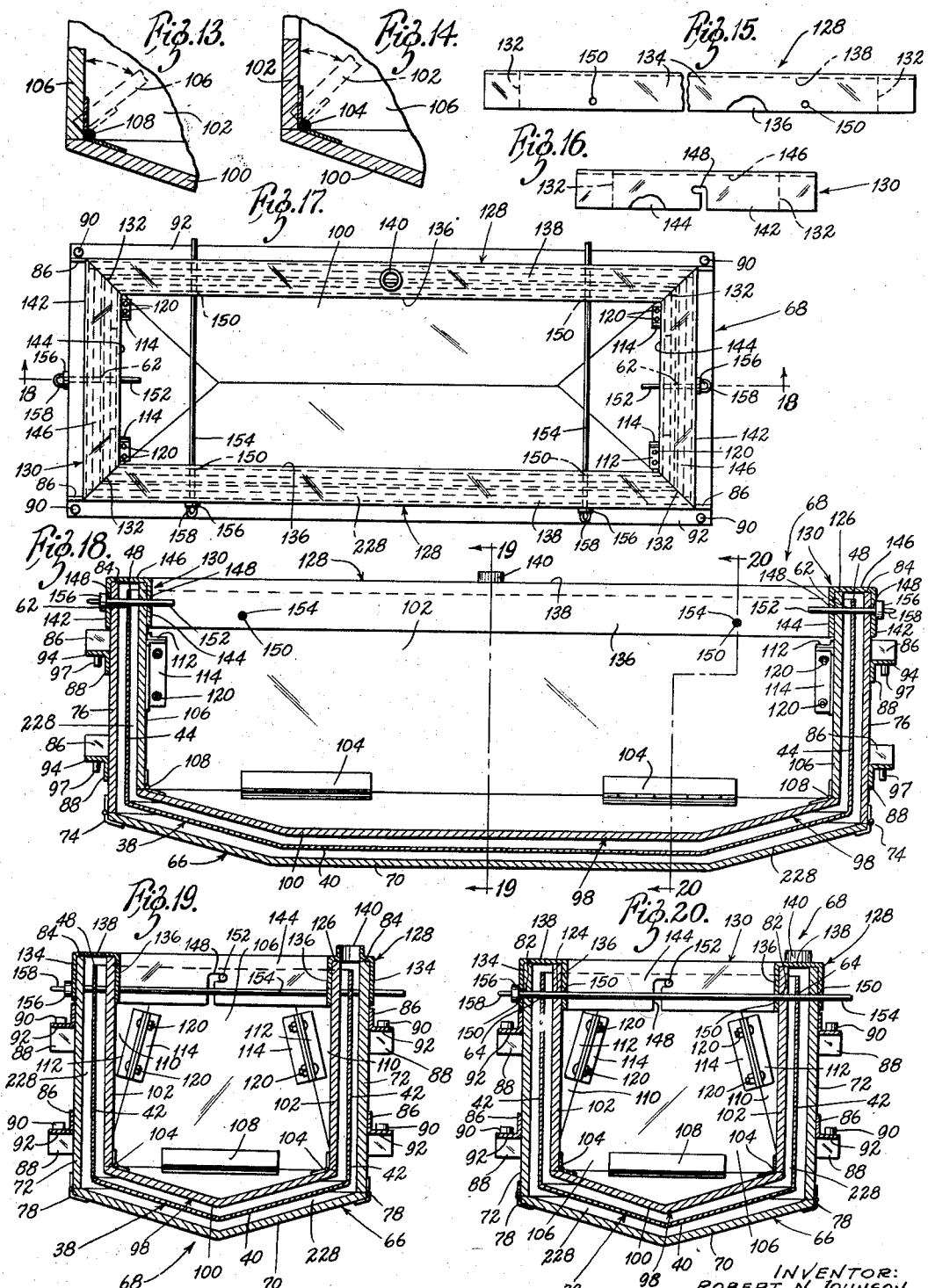
INVENTOR:
ROBERT N. JOHNSON
By Kingsland, Rogers & Ezell
ATTORNEYS

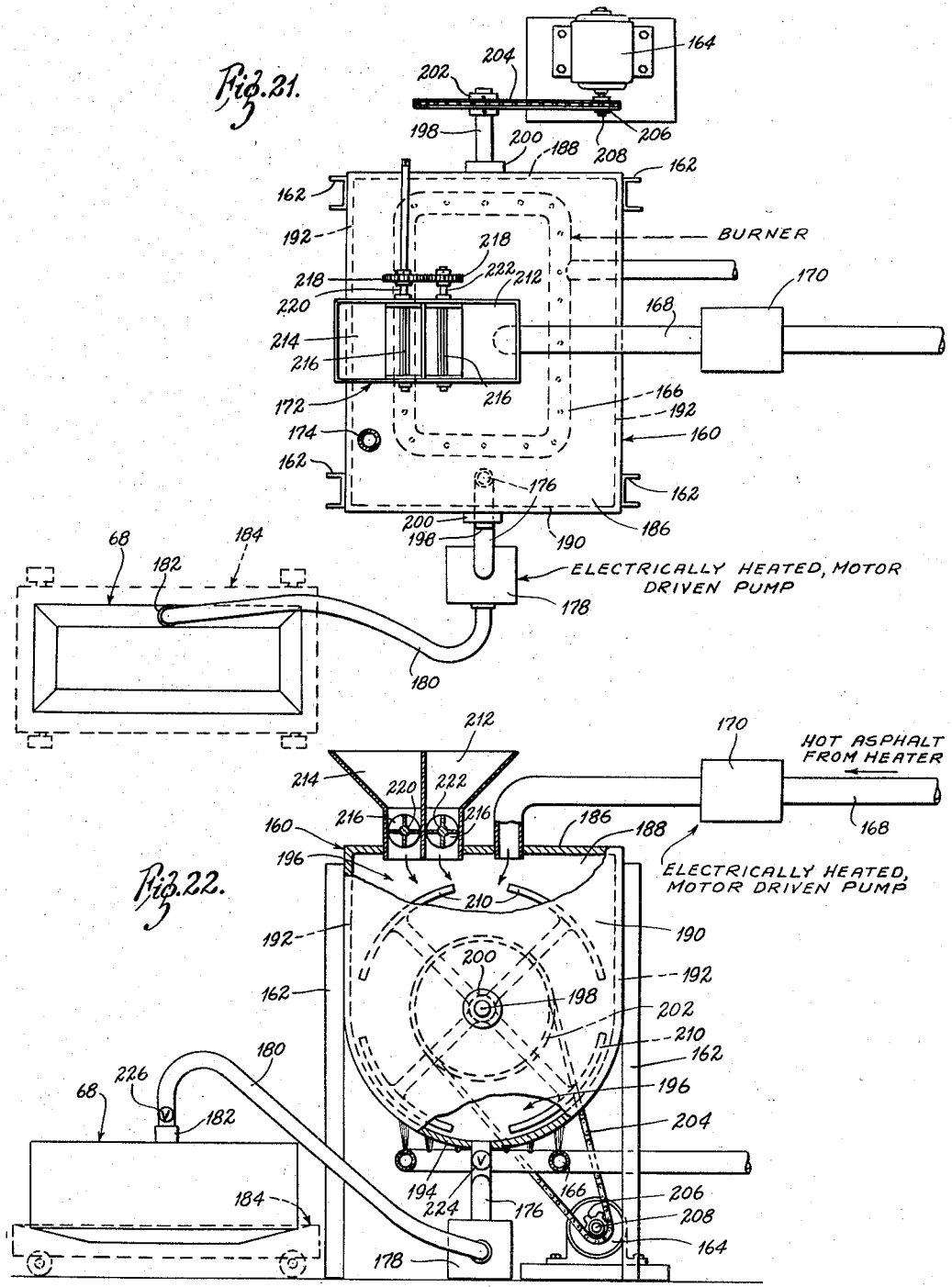

United States Patent Office 2,895,207
Patented July 21, 1959

2,895,207

APPARATUS FOR MOLDING BURIAL VAULT DOMES

Robert N. Johnson, Bonne Terre, Mo.

Application April 30, 1954, Serial No. 426,675

1 Claim. (Cl. 25—130)

The present invention relates generally to a novel and improved apparatus for making a burial vault construction, and more particularly, to the apparatus for the fabrication of the dome member of the burial vault assembly illustrated and described in my copending application, Serial No. 392,187, filed on November 16, 1953.

Specifically, the present invention is directed to the provision of a novel molding apparatus for producing the dome member disclosed in said application.

The dome member under consideration consists of a preformed or precast shell of steel, having an upper or top wall portion of selected configuration that surmounts and is integral with a rectangular main body portion including vertical side and end walls, there being an enveloping layer or covering of an asphalt compound molded or fused onto said shell so as to cover all surfaces thereof, including the bottom peripheral edges of said side and end walls.

As set forth in the copending application aforesaid, the asphalt compound referred to comprises a novel mixture of materials that is inherently resistant to moisture and chemical corrosion. It has a melting point of about 260° Fahrenheit, ⅝ penetration at 77°, and will readily fuse itself to metallic material treated in accordance with the method to be described hereinafter.

Subsequent to hardening, said compound covering is unaffected by variable temperature conditions to which the dome may be normally subjected, either above or below ground.

More specifically, the compound consists of a mixture of approximately 50% asphalt, approximately 25% limestone powder, and approximately 25% dolomite flour, a mixture that has been found to embody superlative qualities with respect to moldability, and to subsequent hardening. The asphalt ingredient is preferably petroleum asphalt that has a melting point of approximately 160° Fahrenheit. The limestone is a filler ingredient, and although preferably in powder form, it is to be understood that less finely divided limestone may be employed. It will also be understood that the invention contemplates substitution for the limestone of other organic or inorganic filler substances such as, for example, finely ground cork. Numerous tests have amply demonstrated that the inherent cohesive and elastic characteristics of the dolomite flour ingredient serve both to firmly and permanently bond the compound covering to the shell, and also to produce in the ultimate shell-enveloping covering what will be termed flexibility, whereby to obviate the formation of cracks or breaks in said covering particularly during extremely cold weather conditions, and yet to provide a covering that will not slump, or slow-flow, when subjected to warm weather conditions.

The primary object of this invention, therefore, is to provide an apparatus for imbedding a precast shell of steel within, and for fusing onto said shell an all-surface enveloping layer of the above-described asphalt compound.

To this end, as will appear, the invention provides a mold assembly including a pair of novel complemental mold sections, and means for suspending the steel shell in inverted disposition between them in such manner that the bottom peripheral edge of said shell is disposed in a plane below that of the upper peripheral edges of said mold sections. The mold sections are contoured correspondingly to the shell. Dimension-wise, however, the outer mold section is larger, and the inner mold section is smaller than said shell, so that when the shell is suspended in proper disposition between them, a predetermined space or clearance is provided about the entire periphery thereof. The space or clearance extent will obviously be predicated on the desired thickness of the asphalt compound covering, as is understood.

Preferably, but not necessarily, an all-around clearance of approximately one-quarter inch is contemplated, so that a burial vault dome member, fabricated in accordance with the concepts of this invention, comprises a shell of steel all surfaces of which are covered by a layer of the hereinbefore described mixture having a thickness of approximately one-quarter of an inch.

Inasmuch as a detailed description of the apparatus of the invention will be given below, it is not deemed necessary to further elaborate thereon at this time. The apparatus employed in attaining the objectives of this invention is adequately illustrated in the accompanying drawings, and a more comprehensive understanding of the invention may be had from the detailed description thereof to follow with reference to said drawings, wherein:

Figure 1 is a top plan view of a burial vault dome member produced in accordance with the teachings of the present invention;

Figure 2 is a vertical sectional view on an enlarged scale, taken transversely of the dome member on the line 2—2 of Figure 1;

Figure 3 is a vertical sectional view on an enlarged scale, taken longitudinally of the dome member on the line 3—3 of Figure 1;

Figure 4 is a bottom plan view of the core, or precast metallic shell of the dome member, the scale of this view corresponding to that of Figure 1;

Figure 5 is an end elevational view, partly in section, of Figure 4;

Figure 6 is a side elevational view of the outer section of the mold assembly of the invention, this view being drawn to a scale corresponding to that of Figures 2 and 3;

Figure 7 is a left end view of Figure 6;

Figure 8 is a magnified fragmentary sectional plan view taken on the line 8—8 of Figure 7;

Figure 9 is an enlarged reproduction of the lower left hand portion of Figure 7;

Figure 10 is a side elevational view of the inner section of the mold assembly, this view being drawn to a scale corresponding to that of Figure 6;

Figure 11 is a left end view of Figure 10;

Figure 12 is an enlarged fragmentary sectional view taken on the line 12—12 of Figure 11;

Figure 13 is an enlarged fragmentary vertical sectional view taken on the line 13—13 of Figure 11;

Figure 14 is an enlarged fragmentary vertical sectional view taken on the line 14—14 of Figure 10;

Figure 15 is a side elevational view of one of a pair of longitudinal U-shaped closure strips included in the mold assembly of the invention;

Figure 16 is a side elevational view of one of a pair of transverse U-shaped closure strips included in said mold assembly;

Figure 17 is a view in top plan of the mold assembly with the preformed shell of Figure 4 suspended therein by means of a longitudinally disposed rod and a pair of spaced transversely disposed rods;

Figure 18 is a longitudinal vertical sectional view on a slightly enlarger scale, taken on the line 18—18 of Figure 17;

Figures 19 and 20 are transverse vertical sectional views taken respectively on the lines 19—19 and 20—20 of Figure 18;

Figure 21 is a schematic layout in top plan of an exemplary organization of machinery and associated elements that is adapted to mix the ingredients of the asphalt compound, and to deliver the compound in fluid state to the mold assembly; and Figure 22 is an elevational view, partly in vertical section, of the structure schematically shown in Figure 1.

With particular reference now to Figures 1 through 5, the burial vault dome construction illustrated is a replica of that disclosed in said copending application, and in the description to follow, the same reference numerals will be employed to designate corresponding parts.

Thus, numeral 20 designates generally a dome member fabricated in accordance with the concepts of the present invention. The dome 20 includes a steel shell 38 that is cast or preformed to provide an upper or top wall portion 40 surmounting and integral with a rectangular main body portion comprising vertical side walls 42, and similar end walls 44. Numeral 46 designates an enveloping layer of an asphalt compound that is molded or fused onto shell 38 by the process to appear, in consequence of which all surfaces of said shell are covered, including the lower peripheral or marginal edges 48 of the side and end walls thereof.

Prior to entering into a detailed description of the novel apparatus provided by this invention whereby to produce the dome 20, attention is directed specifically to Figure 5. As suggested in this view, each end wall 44 of the shell 38 has formed therein on the longitudinal centerline of said shell a small circular opening 62, and each side wall 42 has formed therein a pair of longitudinally spaced similar openings 64, one of each pair being exhibited. It is to be noted that the disposition of these openings is predetermined, and that preferably but not necessarily, the plane whereon the openings 64 are formed is farther removed from the lower marginal edges 48 of the walls than that whereon the openings 62 are formed.

With particular reference now to Figures 6 through 9, numeral 66 designates in its entirety the outer section of a mold assembly that is generally indicated at 68 in Figures 17 through 20.

The outer mold section 66 includes: a base plate 70 that is contoured correspondingly with the top wall portion 40 of the precast shell 38; rectangular side plates 72 that have external hinge connections 74 along their lower edges with the base plate 70; and rectangular end plates 76 that also have external hinge connections 78 along their lower edges with said base plate.

As suggested in Figure 7, each end plate 76 has formed therein on the longitudinal centerline of the mold section, a small circular opening 80, and as suggested in Figure 6, each side plate 72 has formed therein a pair of longitudinally spaced similar openings 82. The disposition of these openings is also predetermined, and preferably but not necessarily, the plane whereon the openings 82 are formed is farther removed from the upper marginal edges 84 of the plates than that whereon the openings 80 are formed.

Suitable means are provided for releasably locking the hingedly mounted side and end plates of the outer mold section 66 in position. The means illustrated comprise vertically spaced angle bars 86 rigidly secured as by welding or otherwise to the side plates 72, similarly spaced angle bars 88 rigidly secured as by welding or otherwise to the end plates 76, and a plurality of locking elements or headed pins 90. As demonstrated especially in Figures 7 and 8, the angle bars are so dispositioned that in the locked status of the mold section, the horizontally projecting leg segments 92 of the bars 86 overlie the similarly projecting leg segments 94 of the bars 88, at each corner of said section. Further, each of the leg segments 92 and 94 has formed therein adjacent each end thereof a hole 96 of a size to accommodate insertion thereinto of the shank portion 97 of one of the locking pins 90. In the aforesaid locked status of the mold section 66, the holes 96 of contiguous angle bars are in registry, so that a pin 90 may be removably inserted into each registering pair of holes, as should be evident.

With particular reference now to Figures 10 through 14, numeral 98 designates in its entirety the inner section of the mold assembly 68.

The inner mold section 98 includes: a base plate 100 that is contoured correspondingly with the top wall portion 40 of the precast shell 38; side plates 102 that have internal hinge connections 104 along their lower edges with the base plate 100; and end plates 106 that have internal hinge connections 108 along their lower edges with said base plate.

As best seen in Figures 11 and 12, the side plate 102 has triangularly contoured extensions 110 that are inturned at right angles to the main rectangular body portion thereof, and the side marginal edges of the end plates 106 are contoured to lie flush with the hypotenuse edges of said extensions when the section 98 is in operative disposition. Rigidly secured, as by welding or otherwise, to the inner surface of each extension 110 and along the hypotenuse edge thereof is an angle bar 112, and similarly secured to the mating edges of each end plate 106 is an angle bar 114. Aligned apertures 116 are provided in the inwardly projecting leg segments 118 of each pair of adjacent bars 112 and 114 for the reception of removable bolt and nut assemblies 120 or the like, whereby the outer surfaces of the extensions 110 and the end plates 106 may be maintained flushly disposed, as demonstrated in Figure 12.

Each of the end plates 106 has formed therein on the longitudinal centerline of the mold section 98, a small circular opening 122, and each side plate 102 has formed therein a pair of longitudinally spaced similar openings 124. The disposition of these openings is also predetermined so as to correspond with the similar openings 80 and 82 of the outer mold section. Thus, the plane whereon the openings 124 are formed is farther removed from the upper marginal edges 126 of the plates than that whereon the openings 122 are formed.

With attention directed now especially to Figures 15 and 16, numeral 128 designates generally one of a pair of longitudinal closure strips, and numeral 130 designates generally one of a pair of transverse closure strips for the mold assembly 68. Of U-shaped configuration, the closure strips are employed in their functional capacity in inverted fashion, and the extremities of each of them are mitered as at 132, in consequence whereof an integrated peripheral seal is provided for closing the mold assembly at the top, as will be explained in more detail.

As viewed in the drawings, each longitudinal closure strip 128 includes integrally an outer leg segment 134, an inner leg segment 136, and a connecting or web segment 138. Numeral 140 designates a spout segment, appropriately formed in one of the two longitudinal closure strips, for the suitable attachment thereto of the delivery end of a conduit that serves to inject the asphalt compound into the mold assembly 68, as will be more comprehensively explained hereinafter. Each transverse closure strip 130 includes integrally an outer leg segment 142, an inner leg segment 144, and a connecting or web segment 146, as clearly illustrated for example in Figure 18.

Provided centrally in the leg segments 142 and 144 of each transverse closure strip 130 is a pair of aligned similar bayonet joint type slots 148, and horizontally aligned and spaced small circular openings are provided in the leg segments 134 and 136 of each longitudinal closure strip 128. In accordance with the hereinbefore established pattern, the disposition of the slots 148 and openings 150 is such that the plane whereon said openings 150 are formed is farther removed from the web segments 138 of the strips 128 than that whereon the slots 148 are formed relatively to the web segments 146 of the strips 130.

In the illustrated mold assembly 68 that is depicted in Figures 17 through 20, four rods are utilized to suspend the core or shell 38 in proper disposition between the outer and inner mold sections 66 and 98, and to simultaneously support the inner section from the outer mold section. What will hereinafter be termed the primary supporting rods are each designated by the numeral 152, and these extend longitudinally of the mold assembly. What will hereinafter be termed the auxiliary supporting rods are each designated by the numeral 154, and they extend transversely of the mold assembly. It is to be noted, however, that the invention is not limited to this specific rod arrangement from a numerical standpoint, although in practice utilization of the four rods illustrated has been found entirely adequate. It should also be noted that although a non-coplanar disposition of the primary relatively to the auxiliary rods has been illustrated and is preferable, the invention is not limited to this precise arrangement.

Each of the rods 152 and 154 preferably terminates at one end in a diametrically enlarged circular boss segment 156 integrally formed therewith, and provided with a laterally projecting loop segment 158, as shown in the drawings.

Figures 21 and 22 present in a generally schematic fashion: a mixing machine 160 appropriately supported by channel columns or the like 162; a motor 164; a gas burner 166; a hot asphalt delivery pipe 168; an electrically heated pump 170 interposed in the pipe 168 between the machine 160 and a source of hot asphalt supply, not shown; a dual compartment hopper 172; a flue 174 leading from the machine to a stack, not shown; a pipe 176 leading from a lowermost region of the machine 160 to an electrically heated pump 178; a flexible conduit 180 leading from the pump 178, and provided on its free end with a suitable fitting 182 adapted to be removably clamped onto the spout 140 of the mold assembly 68; and a dolly 184 for supporting said mold assembly, the dolly being portrayed by broken lines.

The machine 160 is preferably contoured as illustrated, and includes a top wall 186, end walls 188 and 190, side walls 192, and a semi-circular bottom wall 194 that merges into said side walls. Numeral 196 designates a mixing chamber defined by the walls enumerated. A shaft 198 extends longitudinally of the machine through mixing chamber 196, and projects beyond the end walls 188 and 190, where it is rotatably supported in bearings 200. Affixed to the end of shaft 198 that projects beyond the wall 188 is a sprocket wheel 202 having a chain drive connection 204 with a sprocket 206 secured to the motor shaft 208. Rigidly secured to the shaft 198 is a plurality of agitator paddles or blades 210 which are so spaced along said shaft within the mixing chamber 96, that adjacent blades so to speak slightly overlap one another.

Preferably, although not necessarily, the hot asphalt, the limestone powder or equivalent filler substance, and the dolomite flour are deposited into the mixing chamber 196 approximately centrally thereof, these ingredients being metered thereinto concurrently with the inflow of the asphalt. A typical suitable dolomite flour is that calcium-magnesium carbonate obtained in the Bonne Terre, Missouri, field. This flour is very finely divided, being finer than powder. The hopper 172, as previously indicated, is constructed so as to provide a first compartment 212 for the reception of the proportionate quantity of limestone powder or equivalent filler substance, and a second compartment 214 for the reception of the proportionate quantity of dolomite flour. Each compartment is provided with a metering device that may be of any suitable design. The metering devices 216 illustrated in the drawings may be driven conjointly by a pair of meshing gears 218, each affixed to one of the shafts 220 and 222 whereon said metering devices are mounted as shown. The shaft 220 may be extended beyond the end wall 188 of the machine for the application of a handle to the polygonal extremity thereof, whereby to manually activate the metering devices. It is to be understood, however, that any appropriate means may be employed for the purpose of metering the filler substance and dolomite flour ingredients into the mixing chamber concurrently with the inflow thereinto of the hot asphalt.

Numeral 224 designates a symbolically illustrated shut-off valve that is interposed in the pipe 176 immediately below the bottom wall 194 of the machine, and numeral 226 designates a symbolically illustrated combined pressure relief and shut-off valve that is interposed in the flexible conduit 180 in proximity to the fitting 182. The platform of the dolly 184 is contoured appropriately to support the mold assembly. Although not so illustrated, it is to be understood that the pumps 170 and 178 are individually motor driven, and that the initiation and cessation of their operations is switch-controlled, as is that of the motor 164.

*The molding operation*

The manner wherein the vault dome 20 may be produced in accordance with the teachings of the present invention will now be explained. It will be assumed that the core or steel shell 38 has been cast, and is at hand, and that the outer and inner mold sections 66 and 98 have their respective hinged side and end plates locked by means of the pins 90 and the nut-bolt assemblies 120.

The outer mold section 66 is first placed in position on the dolly 184, whereupon a coating of a "non-stick" substance is applied to the inside surfaces of the base plate 70, the side plates 72, and the end plates 76. The "non-stick" substance is composed of fireclay flour mixed with glycerine to a whitewash consistency, and may be painted or sprayed onto said surfaces. The steel shell 38, after all rust, oil, dust and so on has been carefully removed from all surfaces thereof, is next lowered into the mold section 66, and supported therein by means of the primary supporting rods 152, each of which at this time is caused to extend through one of the circular openings 80 of said mold section, and one of the circular openings 62 of said shell.

Thereafter, a coating of the hereinbefore described "non-stick" substance is applied to the outside surfaces of the base plate 100, the side plates 102, their extensions 110, and the end plates 106 of the inner mold section 98. Thus treated, section 98 is lowered into place within the shell 38, whereupon the rods 152 are propelled farther inwardly so as to extend also through the circular openings 122 of said section.

Thereupon, each of the transverse rods 154 is caused to extend successively through one of the openings 82 of the outer section 66, one of the openings 64 of the shell 38, and one of the openings 124 of the inner section 98, whereby, as should be evident, the predetermined all-around clearance is provided about said shell. As a precautionary measure, the transverse rods 154 may be propelled onwardly to also extend successively through the opposite openings 124, 64 and 82.

Thereupon, the rods 154 are withdrawn, the longitudinal closure strips 128 are placed in position, and said rods are reinserted, each extending through one series of the aligned side circular openings of the closure strips 128, the outer and inner mold sections 66—68, and the shell 38, as clearly demonstrated in Figure 20.

The final operation in assembling the mold is to manipulate the transverse closure strips 130 into position. The bayonet slots 148 facilitate this operation as should be evident. Following placement of the transverse closure strips, the rods 152 are propelled inwardly until the bosses 156 thereon engage against the end plates 76 of the outer mold section. It is here noted that a coating of the "non-stick" substance will have been applied to the undersurfaces of the web segments 138 and 146 thereof, prior to mounting the closure strips 128 and 130.

From the foregoing description augmented by an inspection of Figures 17 through 20, the manner wherein the mold assembly 68 is formulated should be manifest. In these views, numeral 228 indicates the resulting mold cavity. It is to be noted that the shell 38 is suspended in said cavity with the proper clearances thereabout to insure coverage of all surfaces of the shell when, as will be explained, the asphalt compound is injected into the mold cavity 228 via the spout 140.

Assuming now that the dolly-supported mold assembly 68 has been conveyed to a point in proximity to the pump 178 of Figures 21 and 22, the fitting 182 of the flexible conduit 180 is clamped onto the spout 140, valve 226 being open, valve 224 being closed, the pumps 170 and 178 being inactive, and the motor 164 being at rest.

The volume of compound required for a successful molding operation having been calculated, a quantity of asphalt equal to approximately 50% of that volume is deposited into a conventional asphalt heater, not deemed necessary to illustrate. A suitable type of asphalt is air blown hard asphalt or the equivalent. During the time elapse wherein the asphalt is brought to a temperature of approximately 450°, the burner 166, having been placed in operation, will heat the mixing machine 160 to a corresponding degree. Any smoke or fumes generated within chamber 196 will escape via flue 174. Further, during said time elapse, a quantity of limestone powder or equivalent filler material equal to approximately 25% of the aforesaid compound volume is deposited into the hopper compartment 212, and a similar quantity of dolomite flour is deposited into the hopper compartment 214. It is here noted that the given percentages of the asphalt compound ingredients may be varied somewhat in accordance with normal climatic conditions prevailing in particular regions of the land. Thus, for example, assuming that the dome is being fabricated for a hot climate area, the asphalt ingredient may be percentage-wise increased somewhat with a proportionate decrease percentage-wise of either the filler ingredient or the dolomite ingredient, as should be understood.

Assuming now that both the asphalt and the mixing machine have been brought to the requisite temperature, motor 164 is energized to effect the rotation of the agitators 210. Thereupon, the pump 170 is also energized to withdraw the hot asphalt from the heater, and deliver it into the mixing chamber 196. Simultaneously with the inflow of the hot asphalt onto the revolving agitator blades, the filler substance and dolomite flour are metered into the mixing chamber 196. Following delivery of the hot asphalt into the machine, the pump 170 may be deenergized. Tests have proven that agitation for a period of forty minutes will result in a complete and thorough mingling of the ingredients under the action of revolving blades 210, the burner 166 continuing in operation whereby to maintain the asphalt heated to liquid consistency.

During this forty minute elapse of time, the mold assembly 68 is brought up to a temperature of 450° by means of hot air blast blowers, and the conduit 180 is similarly treated. It will be remembered that the pump 178 is electrically heated, and inasmuch as the pipe 176 is rigid with the bottom wall 194 of the machine and surrounded by the burner 166, its temperature is also correspondingly high.

Assuming now that the mixing operation has been completed, the pump 178 is placed in operation whereupon the valve 224 is opened, it being recalled that the valve 226 is already open. Consequently, the mixture is pumped into the mold cavity 228 via the flexible conduit 180. The heated condition of the mold assembly 68 insures circulation of the injected mixture throughout said cavity, until it rises to the level defined by the web segments 138 of the longitudinal closure strips 128, and the web segments 146 of the transverse closure strips 130. When this occurs, the pressure built up in the cavity during the injection process will effect the closing of the valve 226, whereupon the pump 178 and the motor 164 are turned off, the fitting 182 is unclamped, and the flexible conduit 180 removed.

The filled mold assembly 68 is now ready for conveyance to a cooling room by means of the supporting dolly 184, which action is taken. Thereupon, the mold assembly is immediately subjected to a spray of cold water that is directed against all portions thereof until the compound cools sufficiently to coagulate, whereupon by means of suitable hood-ended implements applied to the loops 185, the rods 152 and 154 are slowly withdrawn. It is noted that although at this time the compound has congealed sufficiently to properly sustain therein the shell 38 without support from said rods, the relatively minute voids produced as the rods 152 and 154 are withdrawn will, so to speak, plug themselves automatically during the withdrawal operation. With said rods removed therefrom but otherwise undisturbed, the mold assembly is allowed to cool to room temperature. If it is desired to accelerate the cooling process, a spray of cold water may be administered.

It will now be assumed that the assembly is cold, and has been left in such status a sufficient length of time for the asphalt compound to harden, and thus to fuse itself onto the shell 38. The longitudinal closure strips 128 and the transverse closure strips 130 are first removed, it being remembered that the "non-stick" coatings on the undersurfaces of the web segments 138 and 146 obviate adhesion of said strips to the asphalt compound.

Thereafter, in sequence, the bolt-nut assemblies 120 are removed from the angle bars 112 and 114; the end plates 106 are swung inwardly and downwardly about their hinged connections 108; the side plates 102 are swung inwardly and downwardly about their hinged connections 104; and the thus collapsed inner mold section 98 is lifted out of the assembly 68 by means of appropriate hooks provided for the purpose. Inasmuch, it will be remembered, as all of the outside surfaces of the inner mold section 98 had been coated with the described "non-stick" substance, any tendency of the asphalt compound to adhere thereto during the lifting operation of said section is obviated.

Following removal of the inner mold section, the pins 90 are extracted from the holes 97 of the angle bars 86 and 88, whereupon the side plates 72 and the end plates 76 of the outer mold section 66 are swung outwardly and downwardly about their respective hinged connections 74 and 78, thus leaving the ultimately produced dome member 20 in position atop the base plate 70 of mold section 66, whence it may be removed manually or by mechanical means. Here again, the coatings of the "non-stick" substance applied to all of the inside surfaces of the outer mold assembly serve to prevent adhesion thereto of any of the asphalt compound.

It should be realized that the described cycle of a molding operation has been given primarily to demonstrate, in simple fashion, how a burial vault dome 20 of the character shown in Figures 1 through 3 may be produced. In this connection, it should also be realized that the organization of machinery and associated mechanisms exhibited schematically in Figures 21 and 22, is, in actual practice, designed for continuous operations. In other words, the invention contemplates mass production also, so that, for example, an estimated six months' supply of domes 20 may be fabricated in succession and placed in storage.

Obviously, production on such a basis would require a minimum of four dollies 184, and four mold assemblies 68, so that as one of said assemblies is being charged as in Figures 21 and 22, another is being cooled, a third mold assembly is being dismantled, and a fourth mold assembly is being conditioned to replace the first, and so on, as should be manifest. A panel board of push-button switches may also be provided whereby to control motor and pump operations. Since no claim is made herein to such a control system, none has been illustrated.

It is believed, however, that the foregoing description augmented by a study of the drawings discloses a novel apparatus for producing a vault dome member that is superior in many respects to known constructions. Said apparatus obviously may be modified in some particulars without departing from the concepts of the invention. It is also to be understood, as noted hereinbefore, that the invention contemplates the use of a filler ingredient other than limestone, and that the percentage of the filler ingredient relatively to that of the asphalt ingredient may be varied.

What is claimed is:

Apparatus for use in fabricating a burial vault dome member consisting of a precast shell of steel in which all surfaces thereof are to be covered by a layer of an asphalt compound of the character described, said apparatus comprising: a mold assembly including outer and inner mold sections contoured correspondingly to said shell, said outer section being dimensionwise larger and said inner section being dimension-wise smaller than the shell; means to support the inner section within the outer section to provide a mold cavity in said assembly between said sections, and to simultaneously suspend the shell in inverted position within the cavity in such manner that the lower peripheral edges of the shell are disposed in a plane below that of the upper peripheral edges of said mold sections, said supporting means comprising removable pins passing through registered openings in said inner and outer sections and said shell to hold them in supported spaced relation with one another; means for closing the upper open end of the mold cavity comprising closure strips having a U-shaped cross-section engageable in nested relation with the top portions of said inner and outer sections and fitting thereover, said closure strips having a pair of legs provided with openings and attached to a web defining said U-shaped cross-section and fitting over the top portions of the inner and outer sections in inverted relation with said legs acting as spacing stops for said sections, said closure strips being supported upon said inner and outer sections by said removable pins passing through the openings in the legs of said strips; and means for introducing the asphalt compound into said cavity.

References Cited in the file of this patent

UNITED STATES PATENTS

| | | |
|---|---|---|
| 584,953 | Mowrey | June 22, 1897 |
| 682,841 | Chapman | Sept. 17, 1901 |
| 710,391 | Haws | Sept. 30, 1902 |
| 771,303 | Glasson et al. | Oct. 4, 1904 |
| 813,439 | Landon | Feb. 27, 1906 |
| 860,184 | Beckwith | July 16, 1907 |
| 925,929 | Magoris | June 22, 1909 |
| 973,910 | Biswell | Oct. 25, 1910 |
| 987,134 | Flaw | Mar. 21, 1911 |
| 1,170,430 | Dunn | Feb. 1, 1916 |
| 1,289,892 | Perry | Dec. 31, 1918 |
| 1,312,259 | King | Aug. 5, 1919 |
| 1,365,124 | Persson | Jan. 11, 1921 |
| 1,515,057 | Ledyard et al. | Nov. 11, 1924 |
| 1,887,368 | Zeck | Nov. 8, 1932 |
| 1,897,340 | Sielaff | Feb. 14, 1933 |
| 2,171,153 | Warren | Aug. 29, 1939 |
| 2,249,283 | Brady et al. | July 15, 1941 |
| 2,274,236 | Hopkins | Feb. 24, 1942 |
| 2,336,003 | Fifer | Dec. 7, 1943 |
| 2,544,598 | Kalina | Mar. 6, 1951 |
| 2,665,471 | Gould | Jan. 12, 1954 |
| 2,733,495 | Lucas | Feb. 7, 1956 |

FOREIGN PATENTS

| | | |
|---|---|---|
| 253,174 | Great Britain | June 7, 1926 |